(12) United States Patent
So et al.

(10) Patent No.: US 6,195,472 B1
(45) Date of Patent: Feb. 27, 2001

(54) IMAGE PROCESSING APPARATUS AND METHOD

(75) Inventors: Ikken So; Taro Yokose, both of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/096,369

(22) Filed: Jun. 12, 1998

(30) Foreign Application Priority Data

Jun. 13, 1997 (JP) .................................................... 9-156407

(51) Int. Cl.[7] ......................................................... G06K 9/32
(52) U.S. Cl. ........................ 382/296; 382/293; 382/248; 358/433
(58) Field of Search .................................... 382/248, 250, 382/293, 296; 358/426, 432, 433, 448

(56) References Cited

U.S. PATENT DOCUMENTS

| | | | |
|---|---|---|---|
| 4,759,076 | * 7/1988 | Tanaka et al. | 382/296 |
| 5,751,865 | * 5/1998 | Micco et al. | 382/296 |
| 5,867,598 | * 2/1999 | De Queiroz | 382/250 |
| 5,987,191 | * 11/1999 | Suzuki | 382/293 |

FOREIGN PATENT DOCUMENTS

| | | | |
|---|---|---|---|
| 8-204957 | 8/1996 | (JP) . | |
| WO 96/36941 | * 11/1996 | (WO) | G06T/3/60 |

OTHER PUBLICATIONS

Interface '91, JPEG, pp. 160–183, Nov. 29, 1991.

* cited by examiner

Primary Examiner—Thomas D. Lee
(74) Attorney, Agent, or Firm—Oliff & Berridge, PLC

(57) ABSTRACT

An image processing apparatus and method rotates an image at any angle during frequency transform of image coding or image decoding. A basis calculator calculates transform bases according to a rotation angle parameter received from a parameter input unit, and outputs the calculated transform bases to a transform unit. A coordinate calculator calculates input block coordinates according to a rotation parameter, and outputs the calculated input block coordinates to an image input unit. The image input unit extracts an input image block from an input image in accordance with the input block coordinates, and outputs the extracted input image block to a transform unit. The transform unit transforms the input image block by using the transform bases, and outputs transform coefficients to an entropy encoder. The entropy encoder performs entropy coding of the transform coefficients, and outputs code data to an image output unit. Inverse processes are performed for decoding.

41 Claims, 20 Drawing Sheets

$$(5) \quad Y_{uv} = \sum_{m=0}^{7}\sum_{n=0}^{7} X_{mn} C_{mnuv} \quad (C_{mnuv} \text{ IS A TRANSFORM BASIS})$$

$$(6) \quad Y_{00} = X_{00}C_{0000} + X_{01}C_{0100} + \ldots + X_{07}C_{0700} + X_{10}C_{1000} + \ldots + X_{77}C_{7700}$$

$$Y_{01} = X_{00}C_{0001} + X_{01}C_{0101} + \ldots + X_{07}C_{0701} + X_{10}C_{1001} + \ldots + X_{77}C_{7701}$$

○○○

$$Y_{77} = X_{00}C_{0077} + X_{01}C_{0177} + \ldots + X_{07}C_{0777} + X_{10}C_{1077} + \ldots + X_{77}C_{7777}$$

FIG. 4

$$\begin{pmatrix} m_{rot} \\ n_{rot} \end{pmatrix} = \begin{pmatrix} \cos 45 & -\sin 45 \\ \sin 45 & \cos 45 \end{pmatrix} \times \begin{pmatrix} m-m_0 \\ n-n_0 \end{pmatrix} + \begin{pmatrix} m_{rot0} \\ n_{rot0} \end{pmatrix}$$

POSITIONS OF TRANSFORM BASES BEFORE ROTATION → POSITIONS OF TRANSFORM BASES AFTER ROTATION AT AN ANGLE OF 45°

FIG. 7

POSITIONS OF TRANSFORM BASES
AFTER ROTATION AT AN ANGLE OF 45°

$$X_{mn} = \sum_{u=0}^{7}\sum_{v=0}^{7} Y_{uv} C_{mnuv} \quad (12)$$

($C_{mnuv}$ IS A TRANSFORM BASIS)

$$X_{00} = Y_{00}C_{0000} + Y_{01}C_{0001} + \ldots + Y_{07}C_{0007} + Y_{10}C_{0010} + \ldots + Y_{77}C_{0077}$$
$$X_{01} = Y_{00}C_{0100} + Y_{01}C_{0101} + \ldots + Y_{07}C_{0107} + Y_{10}C_{0110} + \ldots + Y_{77}C_{0177}$$
$$\circ\circ\circ$$
$$X_{77} = Y_{00}C_{7700} + Y_{01}C_{7701} + \ldots + Y_{07}C_{7707} + Y_{10}C_{7710} + \ldots + Y_{77}C_{7777}$$

BLOCK OF TRANSFORM
COEFFICIENTS

ROTATE AROUND
u -v AXIS

INVERT SIGNS OF
TRANSFORM COEFFICIENTS
WHERE COORDINATE u IS ODD

IMAGE PROCESSING APPARATUS AND METHOD

BACKGROUND OF THE INVENTION

1. Field of Invention

This invention relates to image processing. In particular, this invention relates to image processing apparatus and methods that can rotate an image at any angle when orthogonal transform coding or decoding is performed.

2. Description of Related Art

Generally, an image contains an extremely large amount of data. When the image is stored or transmitted, it is often compressed by coding. Image coding methods are classified into two classes, i.e. lossless coding and lossy coding. In particular, the lossy coding often uses a technique in which pixel values are transformed into transform coefficients in a frequency domain. This is called a transform process. A decoded image is reconstructed from the frequency domain transform coefficients. This is called an inverse-transform process. One such lossy coding method is a discrete cosine transform, which is used in the well known JPEG (Joint Photographic Experts Group) standards.

There will now be explained a coding or decoding process using a frequency domain transform performed along with an image rotation process. The image rotation process is applied to pixel values in a spatial domain. A spatial domain can be, for example, the X-Y coordinate system. In a coding process, an image should be rotated before performing the frequency domain transform. In a decoding process, an image should be rotated after it is frequency domain inverse-transformed into a spatial domain. Thus, a memory is required to store temporarily the rotated image in the coding process or the inverse-transformed image before rotation in the decoding process. In addition, the total processing time of the coding or decoding process increases.

There is a process that performs a rotation process in a frequency domain without transforming an image into a spatial domain. A conventional rotation process in a frequency domain is disclosed by Japanese Laid-Open Patent Application No. 8-204957.

FIG. 15 is a block diagram illustrating the above-referenced conventional image processing apparatus performing a rotation process. The apparatus includes image input unit 42, transform unit 52, transform coefficient processor 90, entropy encoder 61 and image output unit 71. The reference numerals 141, 151, 159 and 160 represent an input image, transform coefficients, transform coefficients after image processing, and code data, respectively.

Image input unit 42 receives an input image from an outside source and outputs the input image 141 (as a plurality of blocks) to transform unit 52. Transform unit 52 performs a frequency domain transform of each block in the input image, and outputs transform coefficients 151 to transform coefficient processor 90. Transform coefficient processor 90 performs image processing of the received transform coefficients and outputs transform coefficients 159 after the image processing to entropy encoder 61. Entropy encoder 61 performs entropy coding of the transform coefficients 159 after the image processing, and outputs code data 160 to image output unit 71. Image output unit 71 outputs the code data of an image to a recording medium (memory), or the like. According to this configuration, the process of the conventional apparatus is explained with reference to FIGS. 16A through 18.

FIG. 16A shows a conventional process that rotates an input image by an angle of 90°. FIG. 16B is a flowchart illustrating the steps performed by the conventional process shown in FIG. 16A. In this example, (a block of) transform coefficients 151 are rotated at an angle of 90° so as to obtain (a block of) transform coefficients 159. In step S200 of FIG. 16B, transform coefficients 152 in each block are calculated from transform coefficients 151 by replacing a transform coefficient of coordinate (u, v) in 151 with that of coordinate (v, u) (see FIG. 17A). This is referred to as rotation about the u-v axis. In step S210, transform coefficients 159 are calculated by inverting the signs of the transform coefficients 152 located at the odd coordinates u in the block of the transform bases (see FIG. 17B in which the darkened blocks identify the transform coefficient 152 at the odd coordinates). In step S220, each block of (X, Y) is moved to the position (N+1−X, Y) (see FIG. 17C). (X, Y) indicates a position of a block in an image. N indicates the number of blocks in the X direction. Thus, if an image is segmented into a 12×12 matrix of blocks, there are 144 blocks, and N=12. Thus, for example, the block at position (1,1) will be shifted to position (12+1−1,1)=(12,1). As a result of this process, an image is rotated at an angle of 90°. In addition, as shown in FIG. 18, an image can be rotated at an angle of 180° or 270° by performing different combinations of processes similar to the processes described above. (With respect to correlating FIG. 18 to FIG. 15, numerals 153 and 154 are transform coefficients like numeral 151; and numerals 157 and 158 are transform coefficients like numeral 159.) As shown in FIG. 18, to rotate by 180°, perform a top-bottom symmetrical reversing process followed by a left-right symmetrical reversing process; to rotate by 270°, perform a rotation followed by a top-bottom symmetrical reversing process.

As described above, the conventional process can rotate an image at an angle of 90°, 180° or 270° by performing image processing in the frequency domain. Thus, the rotation process can be performed in a frequency domain. However, this method cannot rotate an image at any angle other than 90°, 180° or 270°.

SUMMARY OF THE INVENTION

The present invention has been made in view of the above circumstances. One aspect of the present invention provides an image processing apparatus and method that satisfies the following goals. When a frequency transform is performed in image coding along with a rotation process, a rotated coded image can be obtained without creating a rotated image in a spatial domain. Meanwhile, when a frequency inverse-transform is performed in image decoding along with a rotation process, a rotated decoded image can be obtained without creating a decoded image prior to rotation. In addition, an image can be rotated at any arbitrary angle.

To achieve the above and/or other goals, the present invention provides an image processing apparatus and method that inputs a rotation angle. According to the input rotation angle, transform bases and coordinates in an input image are calculated. A part (e.g., a block) of the input image is input based on the calculated coordinates. Then, the part of the input image is transformed into transform coefficients by using the calculated transform bases. Entropy coding is performed for the transform coefficients. This process is performed for each part of the image.

According to the image processing apparatus and method of the present invention, since an input image is transformed into transform coefficients by using transform bases that are rotated at an arbitrary angle, the transform coefficients become the same as the transform coefficients that are obtained by transforming a rotated image. Accordingly, a coded image rotated at an arbitrary angle can be obtained without creating a rotated image in the spatial domain. As used herein, "arbitrary" angle means any angle, not only 90°, 180 and 270°.

The present invention further provides an image processing apparatus that inputs a rotation angle. According to the input rotation angle, transform bases and coordinates in an output image are calculated. Entropy decoding is performed for an input transform-coded image so as to obtain transform coefficients. The transform coefficients are inverse-transformed into pixel values by using the calculated transform bases. Then, the pixel values are output in accordance with the calculated coordinates in an output image.

According to the image processing apparatus and method of the present invention, since an inverse-transform is performed by using transform bases that are rotated at an arbitrary angle, the image after the inverse-transform become the same as a rotated image. Accordingly, a decoded image rotated at an arbitrary angle can be obtained without creating a decoded image before rotation.

BRIEF DESCRIPTION OF THE DRAWINGS

The invention will be described in conjunction with the following drawings in which like reference numerals designate like elements and wherein:

FIG. 4 is a diagram explaining a DCT (discrete cosine transform) performed by the image processing apparatus of the first embodiment.

FIG. 7 shows an example of transform bases obtained by rotating the transform bases shown in FIG. 6.

FIG. 11 explains an example of a transform process in the image processing apparatus of the first embodiment.

FIG. 12 is a diagram explaining an IDCT (inverse-DCT) performed by the image processing apparatus of the second embodiment.

DETAILED DESCRIPTION OF PREFERRED EMBODIMENTS

Figure 1:
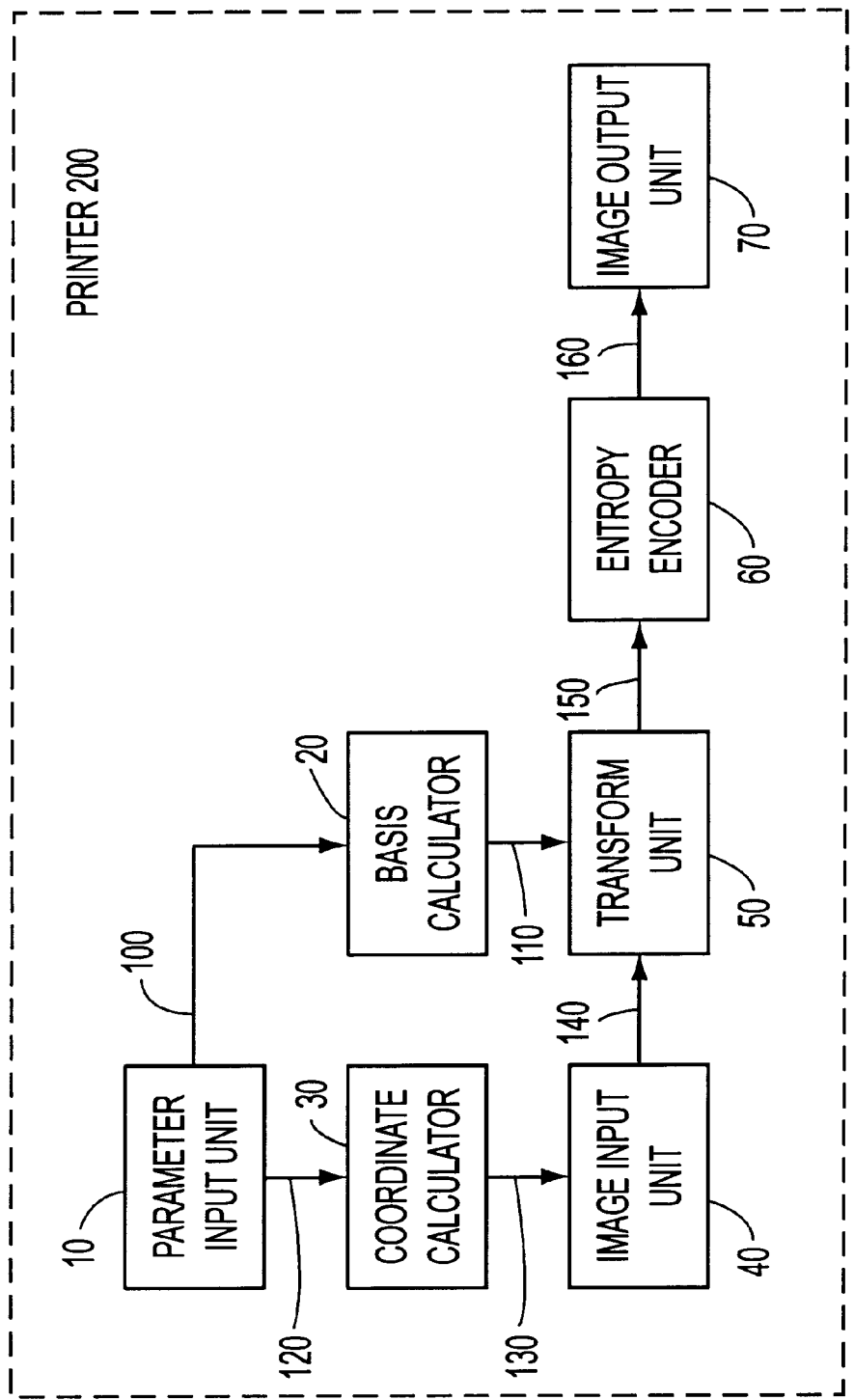
FIG. 1 is a block diagram illustrating an image processing apparatus of a first embodiment of the present invention.

The first embodiment of the present invention performs a rotation process in a coding process that uses a DCT (Discrete Cosine Transform). The coding process (and the FIG. 2 decoding process) can be, for example, a JPEG process that also uses Huffman coding as the entropy coding. FIG. 1 is a block diagram illustrating an image processing apparatus of the first embodiment. This figure includes parameter input unit 10, basis calculator 20, coordinate calculator 30, image input unit 40, transform unit 50, entropy encoder 60, image output unit 70, rotation angle parameter 100, transform bases 110, rotation parameter 120, input block coordinates 130, input image block 140, transform coefficients 150 and code data 160. Rotation parameter 120 includes rotation angle parameter 100 (which is an angle θ) and the coordinates (M0, N0) of the center of rotation of the entire image. All these elements are preferably provided on printer 200. They can be provided on other equipment, such as a digital camera.

Basis calculator 20 calculates transform bases 110 in accordance with rotation angle parameter 100 received from parameter input unit 10, and outputs the calculated transform bases 110 to transform unit 50. Coordinate calculator 30 calculates input block coordinates 130 in accordance with rotation parameter 120, and outputs the calculated input block coordinates to image input unit 40. Image input unit 40 extracts an input image block 140 from an input image according to input block coordinates 130 and outputs the extracted input image block 140 to transform unit 50. Transform unit 50 transforms the input image block 140 into transform coefficients 150 by using transform bases 110, and outputs transform coefficients 150 to entropy encoder 60. Entropy encoder 60 performs entropy coding (in this example, Huffinan coding) for the transform coefficients 150 to obtain code data 160, and outputs the code data 160 to image output unit 70.

The image input unit 40, the transform unit 50, the entropy encoder 60 and the image output unit 70 are implemented using hardware such as, for example, a JPEG circuit (processor) and associated other hardware such as processing memory, input/output ports, etc. The image output unit 70 could be an input/output port by which the data (either compressed data as in FIG. 1 or expanded data as in FIG. 2) is output to equipment such as, for example, a printer mechanism in a printer (see printer mechanism 205 in printer 200 shown in FIG. 2), a memory, a communication network, a disc, a display, etc. The printer 200 can perform various types of printing such as, for example, xerographic, ink jet, etc., using an appropriate printing mechanism 205.

The parameter input unit 10, the coordinate calculator 30 and the basis calculator 20 preferably are implemented by software. That is, a programmed computer performs the functions of unit 10 and calculators 20 and 30. Of course, the programmed computer also can (and preferably does) control the operation of the hardware components discussed above. As such, one aspect on the invention is a program product that includes instructions that can be read by a computer so that the computer can perform image compression and decompression as described herein. The program product can be, for example, a memory that stores a program to be installed in the image processing apparatus. At its most basic level, the program product is a data signal that is embodied in a carrier wave. The carrier wave can be transmitted, for example, over a communication network such as, for example, the World Wide Web. The carrier wave also can be stored, for example, in ROM or RAM, in a fixed or removable memory (such as a hard drive or a CD ROM), can be provided as part of the overall computer system or sold separately as an add-on.

In one preferred embodiment, the image processing apparatus is a printer. The various elements discussed above are provided within the housing of the printer. Alternatively, the components can be provided externally of the printer, for example, in a computer to which the printer is attached as a peripheral device.

Figure 3:
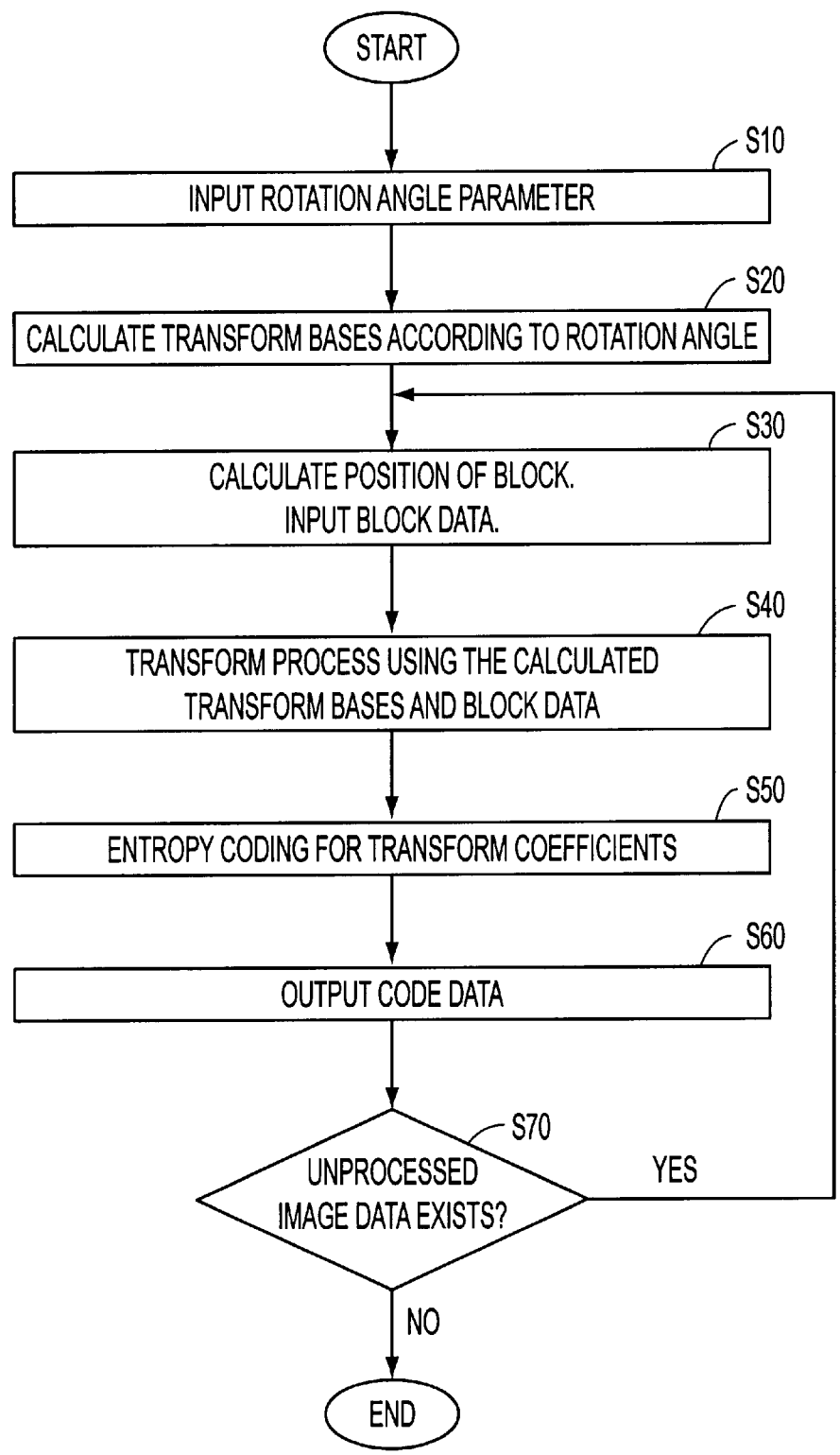
FIG. 3 is a flowchart illustrating an image rotation process performed by the image processing apparatus of the first embodiment.

According to the configuration described above, a process performed by the image processing apparatus is explained below. FIG. 3 is a flowchart illustrating a process of this embodiment.

In step S20, rotated transform bases 110 are calculated according to a rotation angle parameter, which is input in step S10. In step S30, a center coordinate in a source image, which corresponds to a center coordinate of a block in a destination image, is determined in accordance with the rotation parameter. The destination image is an image obtained by rotating the source image in accordance with the rotation angle parameter. Next, coordinates of a block in the source image are calculated in accordance with the determined center coordinate and the rotation angle parameter. Then, pixel values in the determined coordinates of the block in the input image are input as the input image block 140. In step S40, the input image block 140 is transformed to transform coefficients 150 by using the transform bases 110 calculated by basis calculator 20.

In step S50, the block of transform coefficients 150 is then entropy coded in a conventional manner using, for example, Huffman coding, to produce code data 160. In step S60, the code data 160 is then output to image output unit 70, which stores and/or transmits the compressed data. Via step S70, steps S30–S60 are repeated on subsequent blocks of image data until the entire image is processed.

One principle of the present invention is now explained. Problems of the conventional art include:

(1) When a rotation process and a decoding (inverse-transform) process are performed for a coded image, the rotation process should be performed after the coded image is decoded to be an image in the spatial domain. When a rotation process and a coding (transform) process are performed for an image (in a spatial domain), the coding process should be performed after the image is rotated in the spatial domain.

(2) A rotation process at an angle of 90°, 180° or 270° can be performed for transform coefficients in a frequency domain. However, it is impossible to perform rotation at other angles.

The following facts can be derived from the above problems.

(1) Since a rotation process requires coordinate transform, it is difficult to perform in the frequency domain. Therefore, the transform coefficients in the frequency domain should be transformed into a pixel image in the spatial domain before the rotation process is performed.

(2) In the u-v coordinate system of the frequency domain, only a simple process, such as a symmetric replacement with respect to the u or v axis, can be applied to the transform coefficients. Accordingly, the image in the frequency domain can be rotated only at an angle of 90°, 180° or 270°.

Generally, image processing repeatedly accesses a huge image memory space. When two image processes are performed in parallel, the number of memory accesses and the amount of the memory space is approximately doubled. The time period used by the memory accesses occupies a large proportion of the total image processing time. Thus, when an image is rotated before the image is coded, or a coded image is decoded before the rotation process, the amount of memory and processing time increase.

The problems described above are resolved if a rotation process is performed during the frequency transform or the inverse-transform in the image coding or decoding process. According to the prior art technique, the coordinate transform can only be performed for rotation at an angle of 90°, 180° or 270° in the frequency domain.

The present invention applies a coordinate transform to the transform bases used by the frequency transform or inverse-transform process. Therefore, by rotating a block of the transform bases at any arbitrary angle for use in the frequency transform process, a compressed image rotated at any arbitrary angle can be obtained without performing a rotation process in a spatial domain.

Thus, this invention rotates transform bases at any arbitrary angle to resolve the problem described above. A calculation of the rotated transform bases and an algorithm that rotates an image at any arbitrary angle by using the rotated transform bases is now described for one example.

The DCT used in this embodiment is the so-called two-dimensional DCT. According to "International Standard Coding Method of Color Still Image -JPEG Algorithm," Endo, Interface, 1991, December, pp. 160–182, the DCT and the IDCT (Inverse DCT) for an 8×8 block of an image consisting of 8 bit pixels are represented by the following equations. x(m, n) (m, n=0–7) constitute a block of an image that is to be transformed. y(u, v) (u, v=0–7) constitute a block of transform coefficients obtained by transforming the image block x(m, n).

$$y(u, v) = \frac{C(u)C(v)}{4} \sum_{m=0}^{7} \sum_{n=0}^{7} (x(m, n) - 128) \cos\frac{(2m+1)u\pi}{16} \cos(2n+1)v\frac{\pi}{16} \quad (1)$$

$$x(m, n) = \sum_{u=0}^{7} \sum_{v=0}^{7} C(u)C(v)y(u, v) \cos\frac{(2m+1)u\pi}{16} \cos(2n+1)v\frac{\pi}{16} + 128 \quad (2)$$

$$C(u), C(v) = \frac{1}{\sqrt{2}} \quad (\text{if } u, v = 0)$$
$$= 1 \quad (\text{other})$$

If a transform basis of a two-dimensional DCT is identified as c(m, n, u, v), equation (1) is represented by the following two equations.

$$y(u, v) = \frac{C(u)C(v)}{4} \sum_{m=0}^{7} \sum_{n=0}^{7} (x(m, n) - 128) c(m, n, u, v) \quad (3)$$

$$c(m, n, u, v) = \cos\frac{(2m+1)u\pi}{16} \cos(2n+1)v\frac{\pi}{16} \quad (4)$$

Equations (3) and (4) have the same form as equations (5) and (6) shown in FIG. 4, respectively. Thus, each of the transform coefficients Y00–Y77 can be calculated by summing 64 products as illustrated in FIG. 4. When transform bases c(m, n, u, v) (m, n, u, v=0–7) rotated at an arbitrary angle are stored in a buffer beforehand and a transform process is performed by using the stored transform bases, transform coefficients for a rotated image can be obtained. The procedure for calculating the transform bases is explained below with reference to FIGS. 5, 6, and 7.

Figure 5:
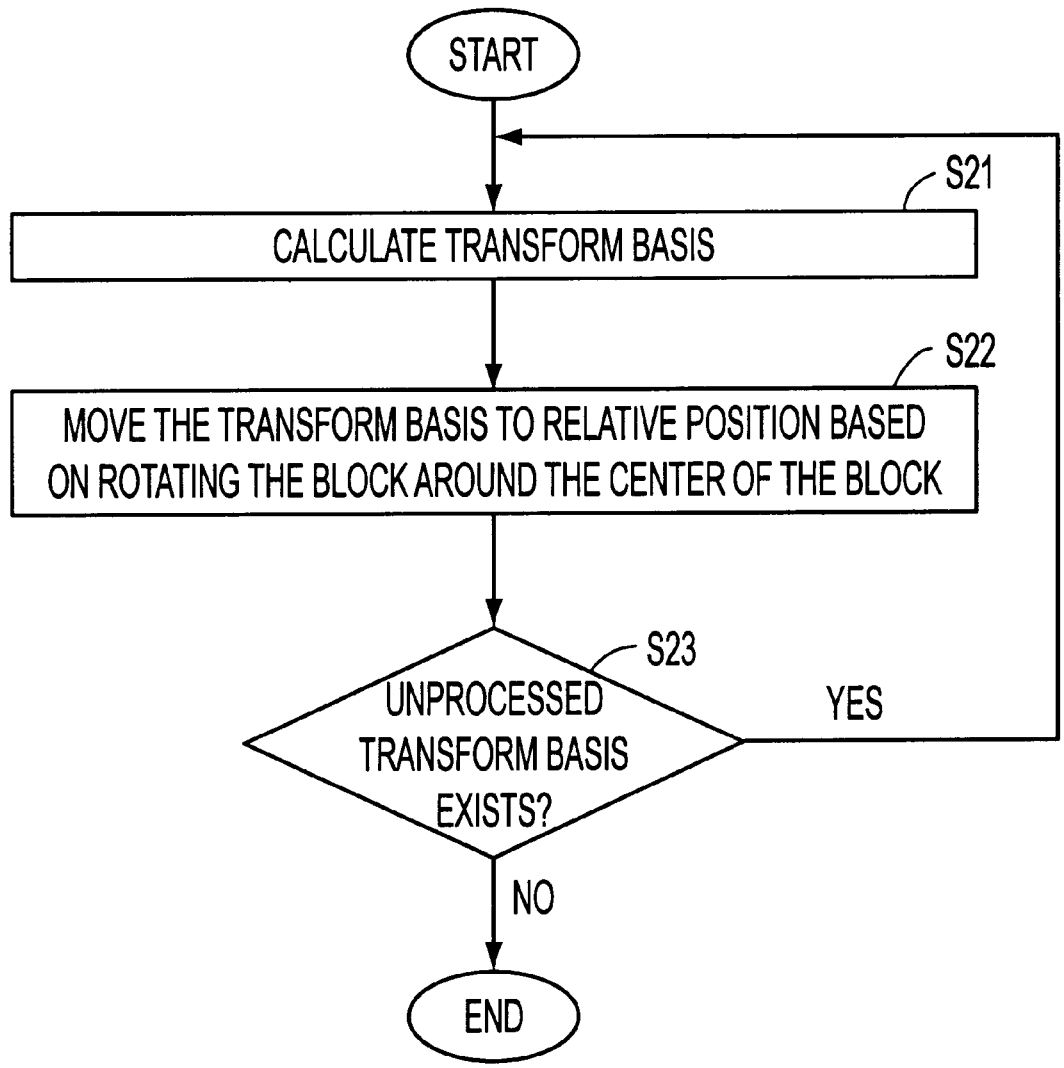
FIG. 5 is a flowchart illustrating a process creating rotated transform bases performed by the image processing apparatus of the first or second embodiment.

FIG. 5 is a flowchart for calculating a block of transform bases after rotation. In step S21, a transform basis in the block is calculated according to equation (4). Equation (4) includes four variables consisting of u and v in the frequency domain and m and n in the spatial domain. A coordinate transform can be applied for m and n in the spatial domain. In step S22, the transform basis calculated in step S21 is rotated by using equation (7). In other words, coordinates (mrot, nrot) for storing the transform basis after rotation are calculated. In equation (7), (m0, n0) is the center of the block containing the transform basis calculated in step S21, i.e. before rotation. (mrot0, nrot0) is the center of the block after rotation. θ is the rotation angle. Via step S23, steps S21 and S22 are repeated for each transform basis in the block.

$$\begin{pmatrix} m_{rot} \\ n_{rot} \end{pmatrix} = \begin{pmatrix} \cos\theta & -\sin\theta \\ \sin\theta & \cos\theta \end{pmatrix} \times \begin{pmatrix} m - m_0 \\ n - n_0 \end{pmatrix} + \begin{pmatrix} m_{rot0} \\ n_{rot0} \end{pmatrix} \quad (7)$$

Figure 6:
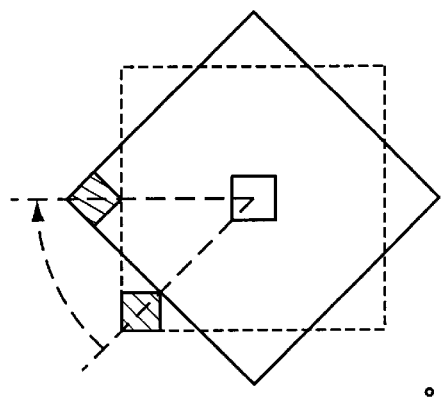
FIG. 6 shows an example of transform bases before rotation in the image processing apparatus of the first or second embodiment.
Figure 7:
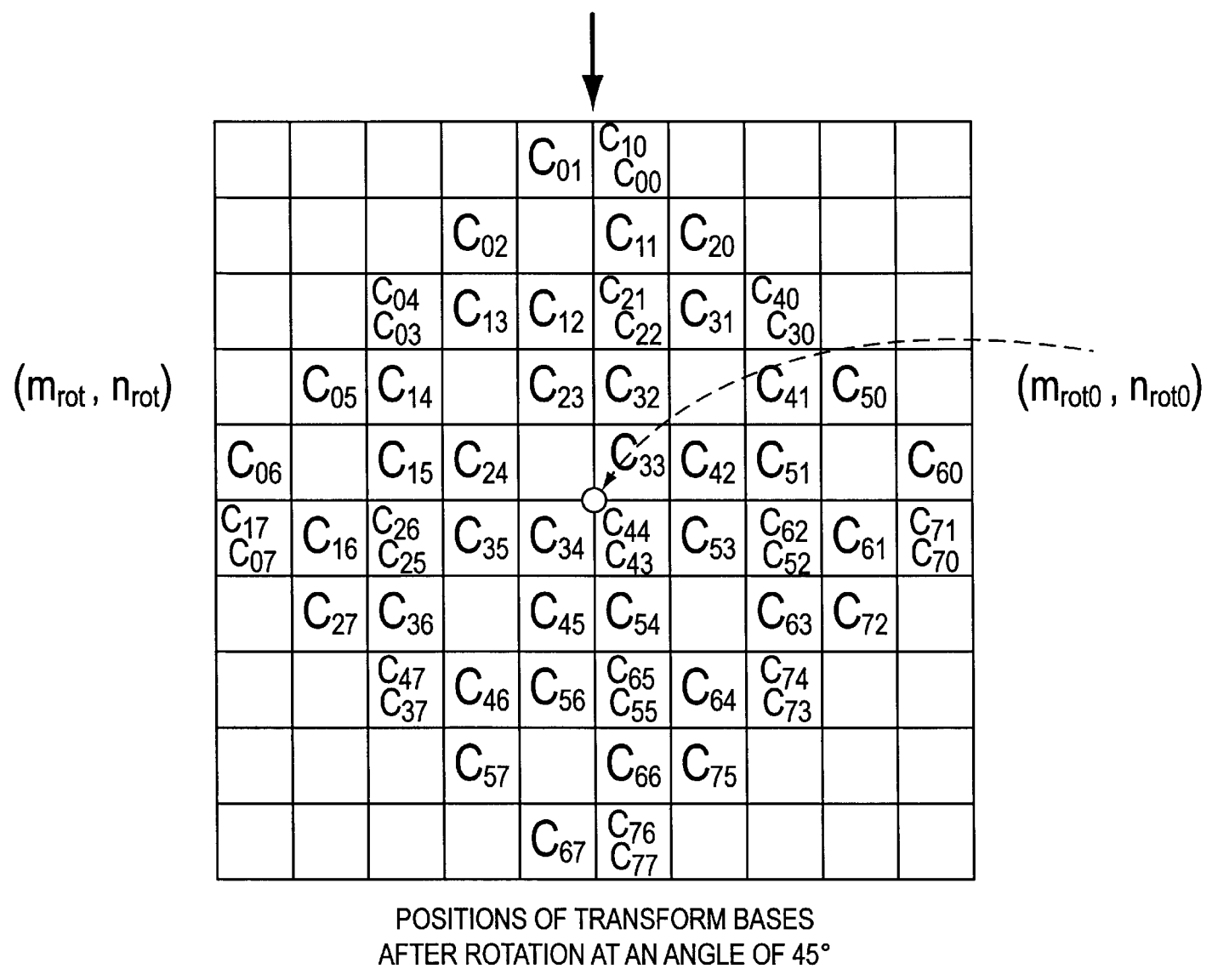

An example is shown when transform coefficient YOI is calculated according to equation (6). In order to calculate transform coefficient YO 1, transform bases C0001 through C7701 are calculated in advance. Transform bases C0001 through C7701 are calculated by using equation (4) where u=0 and v=1, and m and n are changed from 0 to 7. The calculated bases, C0001 through C7701, are stored into memory areas, such as a buffer, indicated by mrot and nrot. FIG. 6 shows an example of an 8×8 block of DCT bases, Cuv. FIG. 7 shows transform bases obtained by rotating Cuv by a rotation angle of 45°.

Figure 8:
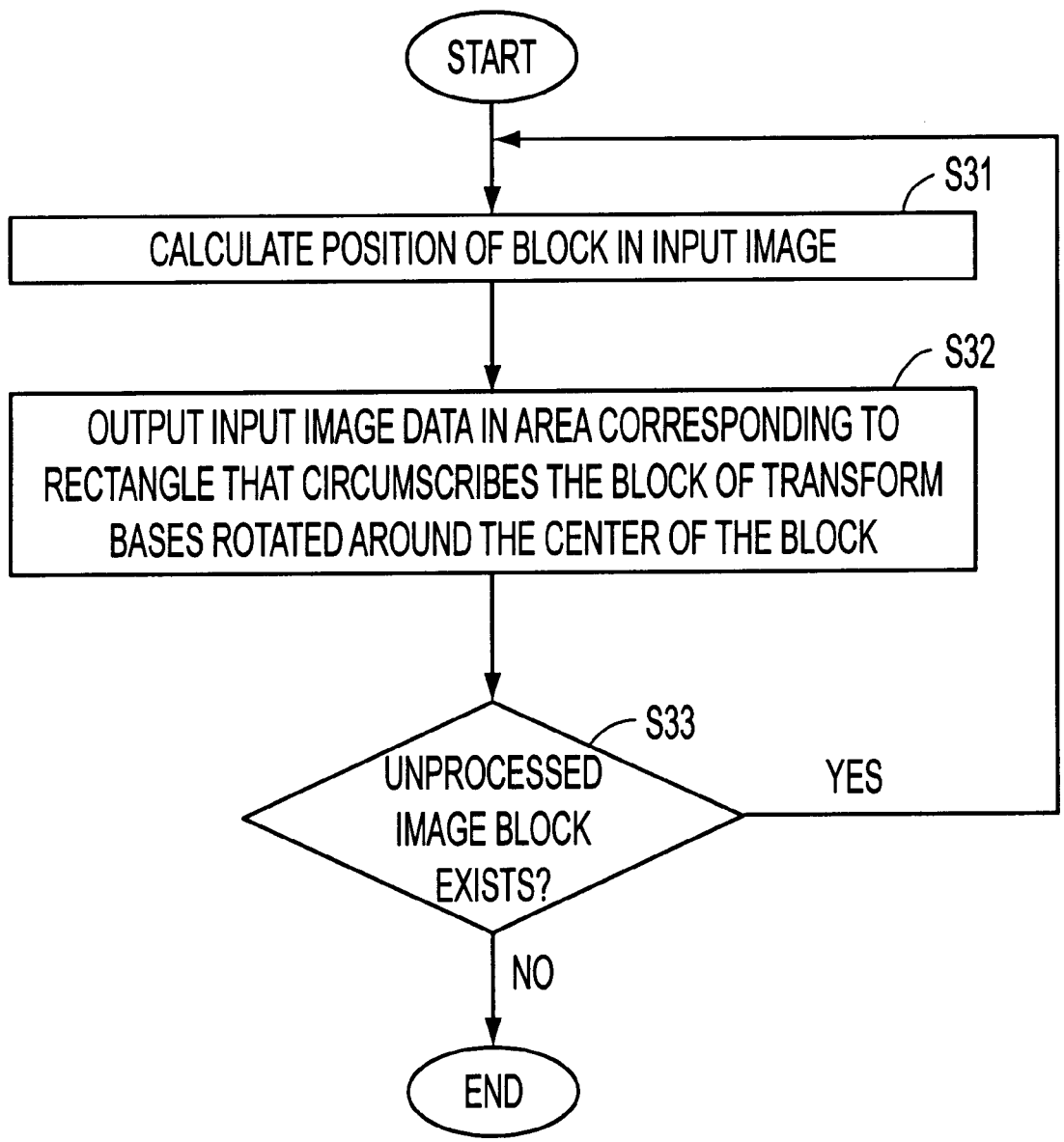
FIG. 8 is a flowchart illustrating an image input process performed by the image processing apparatus of the first embodiment.

Next, the procedure of step S30 in FIG. 3, which calculates a position of a block in an input image and inputs block data, which is pixel values in the block, is explained. FIG. 8 is a flowchart illustrating the procedure of step S30 in detail. In step S31, (Msrc, Nsrc) is calculated in accordance with (Mdes, Ndes) and the rotation parameter, which includes the rotation angle parameter (θ) and the center of rotation (M0, N0) of the entire image (see FIG. 9) according to equation (8). (Msrc, Nsrc) is a coordinate indicating the center of a block in an input image. (Mdes, Ndes) is a coordinate indicating the center of a block in an output image. (Msrc, Nsrc) is related to (Mdes, Ndes). In other words, when the in put image is rotated to be the output image, the pixel value in (Msrc, Nsrc) moves to (Mdes, Ndes). In s te p S32, pixel values included in the bl ock in the input image are input. The block in the input image corresponds to a rectangle circumscribed with the block of transform bases after rotation. The center of the block is (Msrc, Nsrc) calculated by step S31. Via step S33, steps S31 and S32 are repeated for each block in the image.

$$\begin{pmatrix} M_{src} \\ N_{src} \end{pmatrix} = \begin{pmatrix} \cos\theta & \sin\theta \\ -\sin\theta & \cos\theta \end{pmatrix} \times \begin{pmatrix} M_{des} - M_0 \\ N_{des} - N_0 \end{pmatrix} + \begin{pmatrix} M_0 \\ N_0 \end{pmatrix} \quad (8)$$

Figure 9:
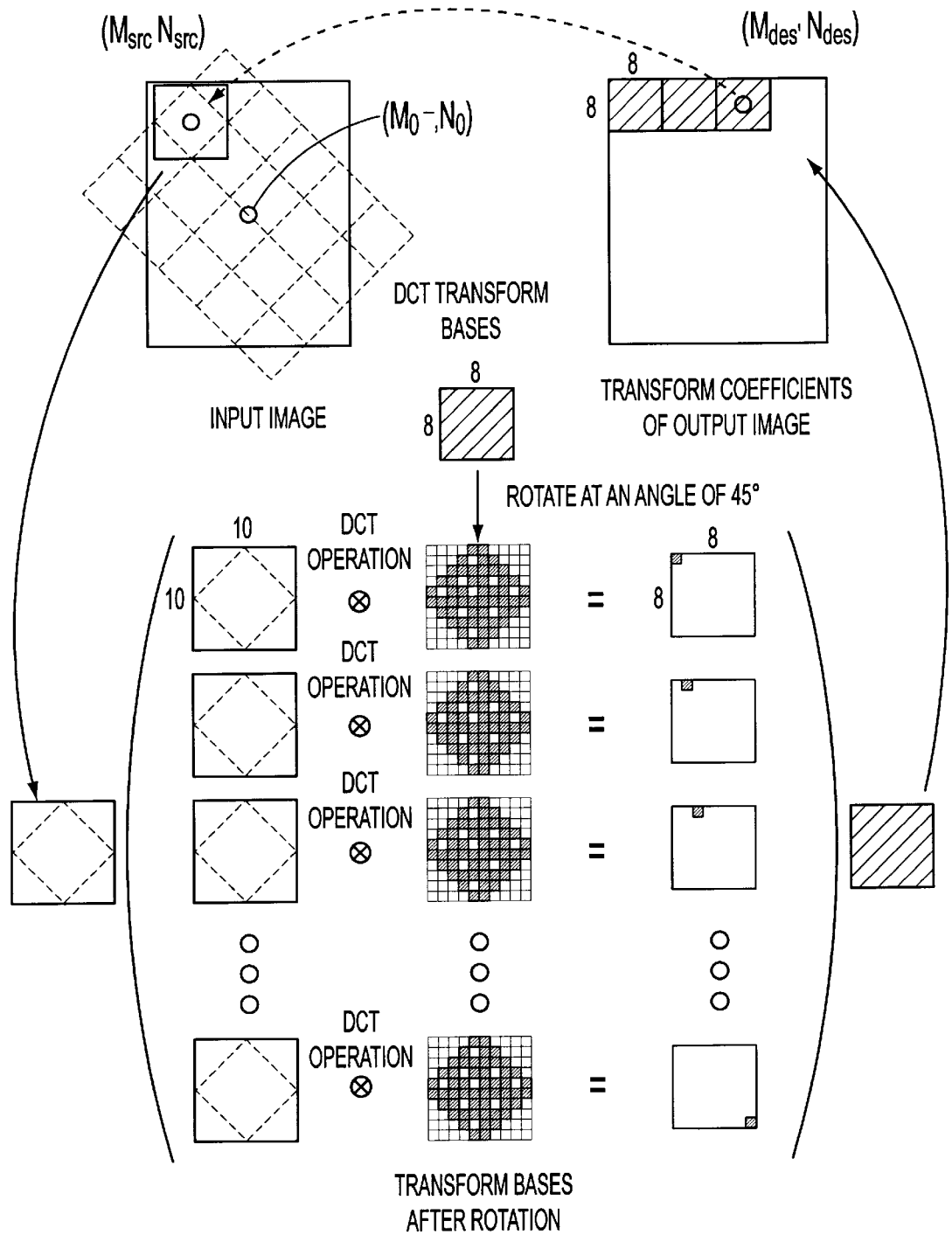
FIG. 9 is a diagram illustrating data flow in the image processing apparatus of the first embodiment.

FIG. 9 shows data flow when an input image is transformed to transform coefficients of an output (rotated) image. An example is explained with reference to FIG. 9. As shown in FIGS. 6 and 7, when an 8×8 block of transform bases is rotated at an angle of 45°, a 10×10 block that circumscribes the rotated block of the transform bases is obtained. Image input unit 40 extracts data (pixel values) in the 10×10 block centered around (Msrc, Nsrc) from the input image, and outputs the extracted block data to transform unit 50.

Figure 10:
FIG. 10 shows an example of a transform process in the image processing apparatus of the first embodiment.
Figure 11:
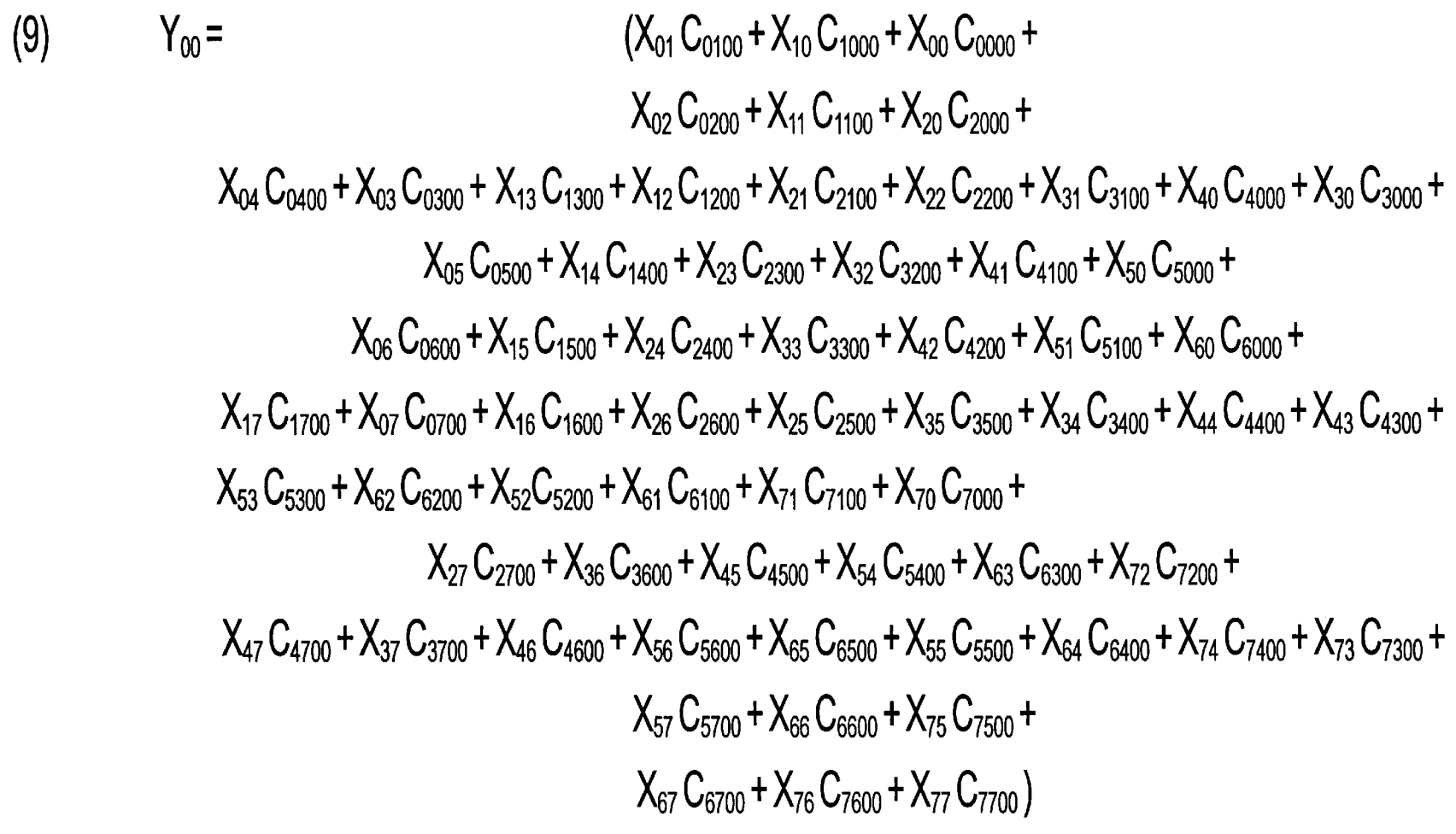

The transform process in step S40 shown in FIG. 3 is explained with reference to FIGS. 9 and 10. As shown in equation (5), the sum of 64 products is performed in order to calculate one transform coefficient. Therefore, for an 8×8 block, 64 such sums are calculated for one block. In the example of FIG. 9, the transform process is performed for a 10×10 block according to equation (1). However, as shown in FIG. 10, since there are only 64 transform bases in the 10×10 block, only 64 of such sums are performed. Equation (9) shown in FIG. 11 is a calculation of transform coefficient Y00, which is derived from equation (6) by using the transform bases shown in FIG. 7.

Transform coefficients Y00 through Y77, which are obtained by the transform process described above, are the transform coefficients for an 8×8 block in a rotated image. Image output unit 70 outputs these transform coefficients Y00 through Y77 to the block centered around (Mdes, Ndes) in the output image (see FIG. 9).

Figure 2:
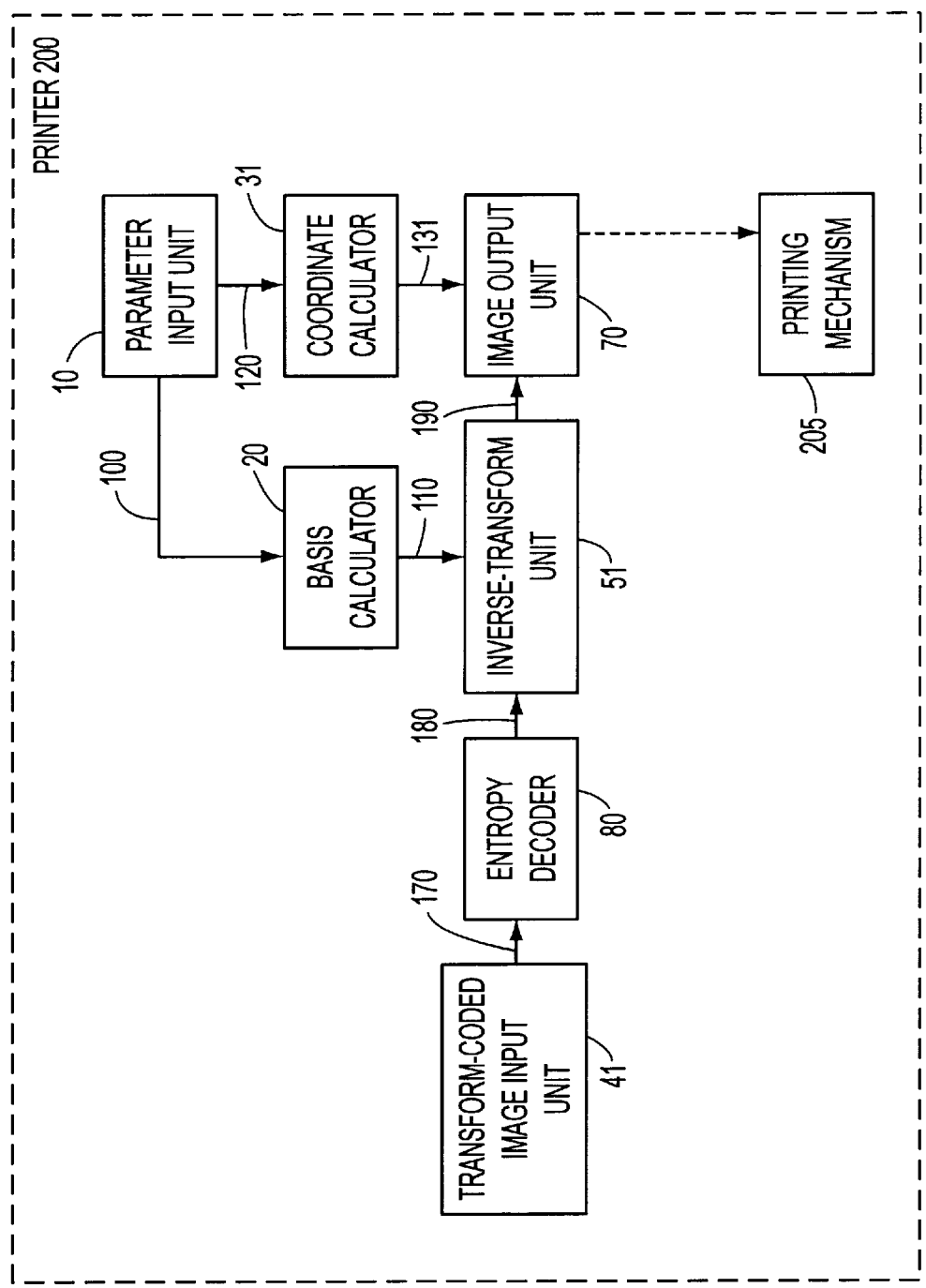
FIG. 2 is a block diagram illustrating an image processing apparatus of a second embodiment of the present invention.

A second embodiment of the invention relates to an image decoding process. FIG. 2 is a block diagram illustrating the second embodiment. Parameter input unit 10, basis calculator 20, rotation angle parameter 100, transform bases 110 and rotation parameter 120 are the same as in FIG. 1. Therefore, they have the same reference numbers and are not explained here. FIG. 2 further includes coordinate calculator 31, transform-coded image input unit 41, entropy decoder 80, inverse-transform unit 51, image output unit 70, output block coordinates 131, transform-coded image data 170, transform coefficients 180 and inverse-transformed image data 190.

Transform-coded image input unit 41 outputs transform-coded image data 170 to entropy decoder 80. Entropy decoder 80 decodes transform-coded image data 170 and outputs transform coefficients 180 to inverse-transform unit 51. Inverse-transform unit 51 performs an inverse-transform of transform coefficients 180 by using transform bases 110, and outputs inverse-transformed image data 190 to image output unit 70. Image output unit 70 outputs inverse-transformed image data 190 corresponding to output block coordinates 131 calculated by coordinate calculator 31.

Figure 13:
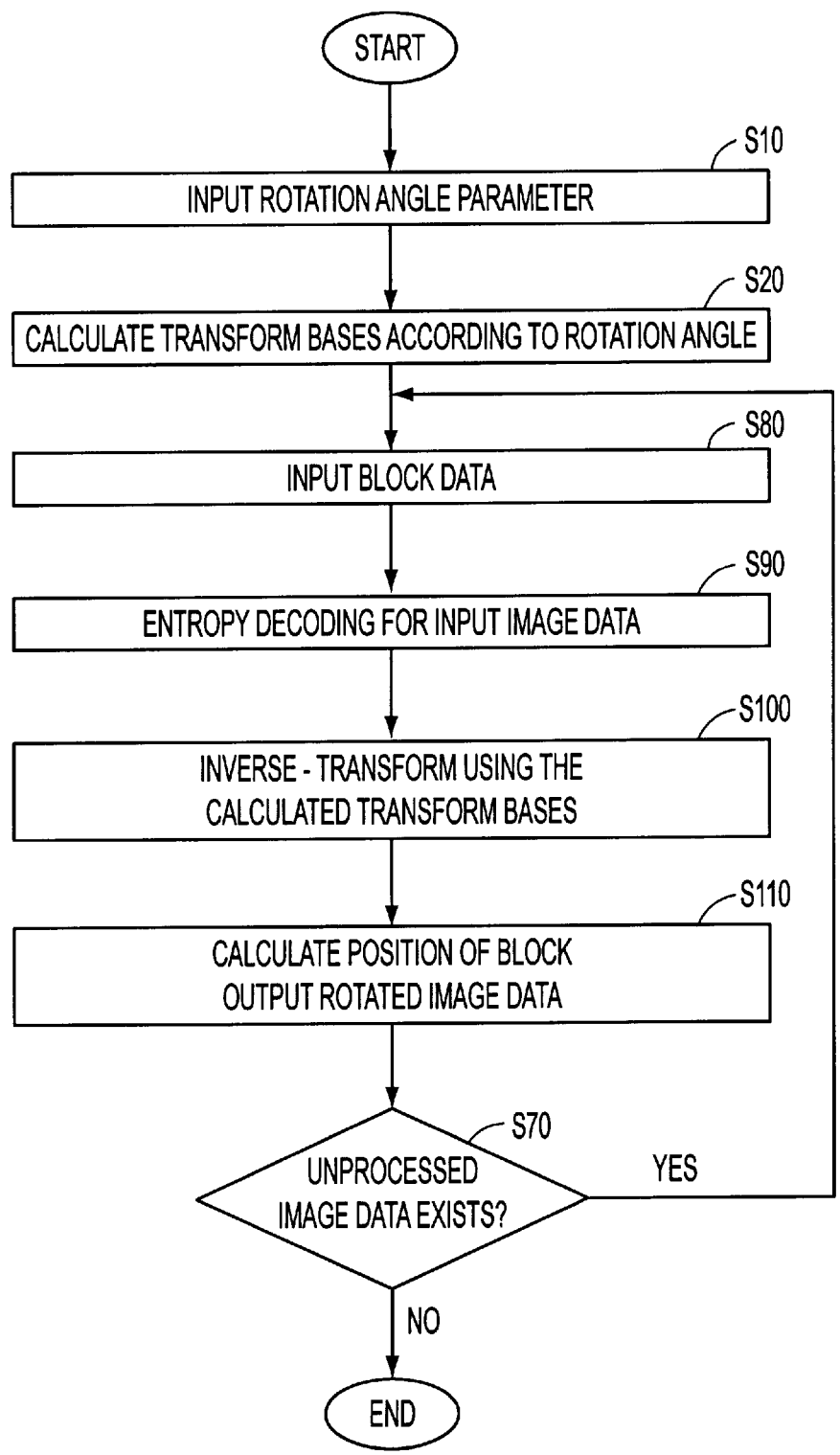
FIG. 13 is a flowchart illustrating an image rotation process performed by the image processing apparatus of the second embodiment.

Next, the procedure of the second embodiment is explained. FIG. 13 is a flowchart illustrating the procedure of the second embodiment. The procedure is explained with reference to FIG. 13; however, operations that are the same as the first embodiment are given the same reference numbers and are not explained here.

In step S80, a block of transform-coded image data is input. In step S90, entropy decoding is performed on the transform-coded image data to obtain transform coefficients. In step S100, the transform coefficients are inverse-transformned to block data (inverse-transformed image data) of an output image by using transform bases after rotation. In step S110, it is calculated where the block data is located in the output image. Then, the block data is output to the calculated position. As a result of step S70, steps S80–S110 are repeated until the entire image is processed.

The process in step S100 is explained in detail below. The inverse-transform is represented by equation (2). Equation (2) can be transformed to equations (10) and (11) in the same way as the first embodiment.

$$x(m, n) = \sum_{u=0}^{7} \sum_{v=0}^{7} y(u, v) c'(m, n, u, v) + 128 \quad (10)$$

$$c'(m, n, u, v) = C(u)C(v)\cos\frac{(2m+1)u\pi}{16}\cos(2n+1)v\frac{\pi}{16} \quad (11)$$

$$C(u), C(v) = \frac{1}{\sqrt{2}} \quad (\text{if } u, v = 0)$$
$$= 1 \quad (\text{other})$$

Equations (10) and (11) have the same form as equations (12) and (13) shown in FIG. 12.

One piece of the inverse-transformed image data (X00–X77) is calculated by summing 64 products. When transform bases c (m, n, u, v) (m, n, u, v=0–7) rotated at an arbitrary angle are stored in a buffer beforehand and an inverse-transform process is performed by using the stored transform bases, the transform coefficients are inverse-transformed to pixel values for a rotated image.

Figure 14:
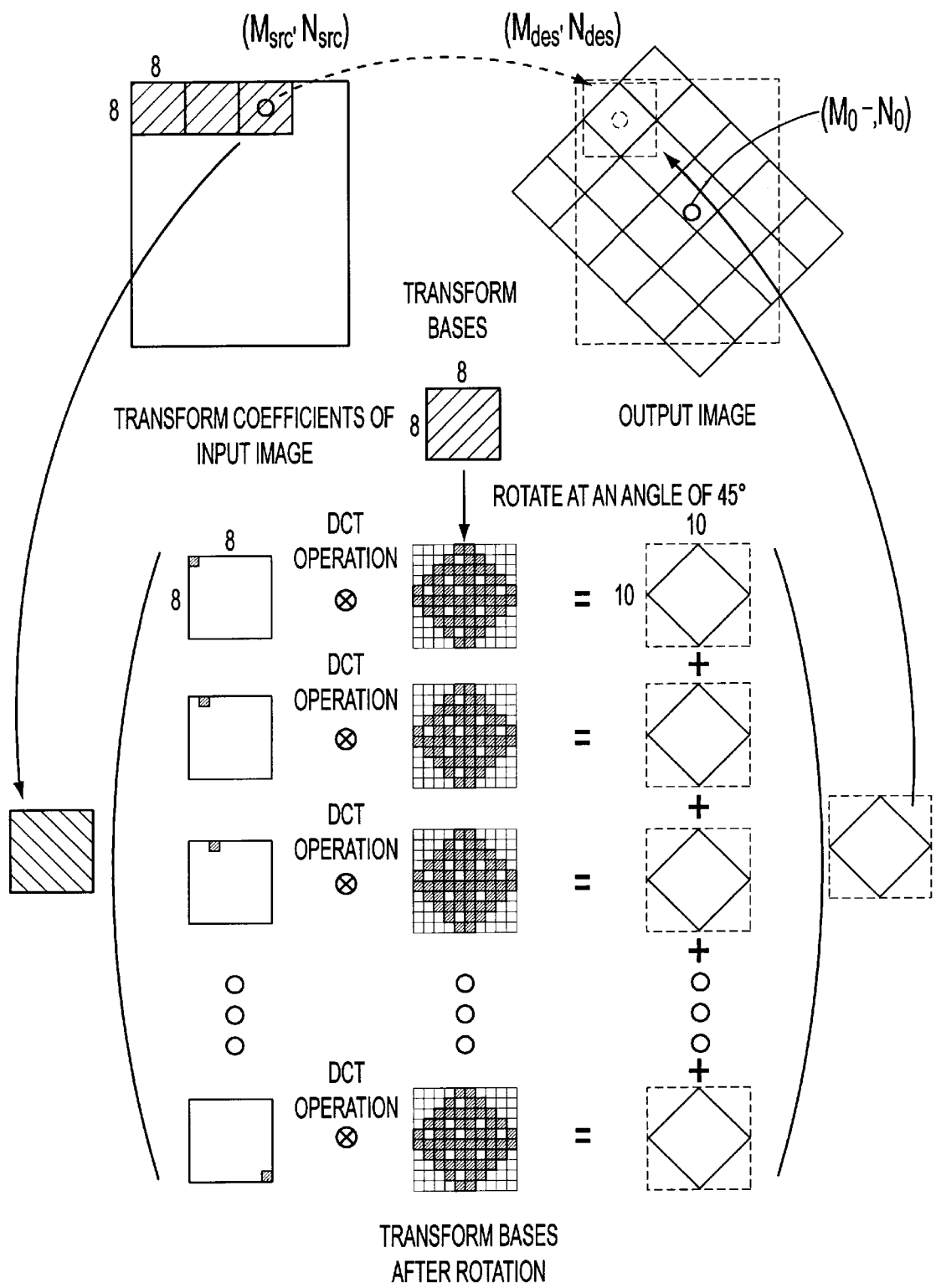
FIG. 14 is a diagram illustrating data flow in the image processing apparatus of the second embodiment.
Figure 15:
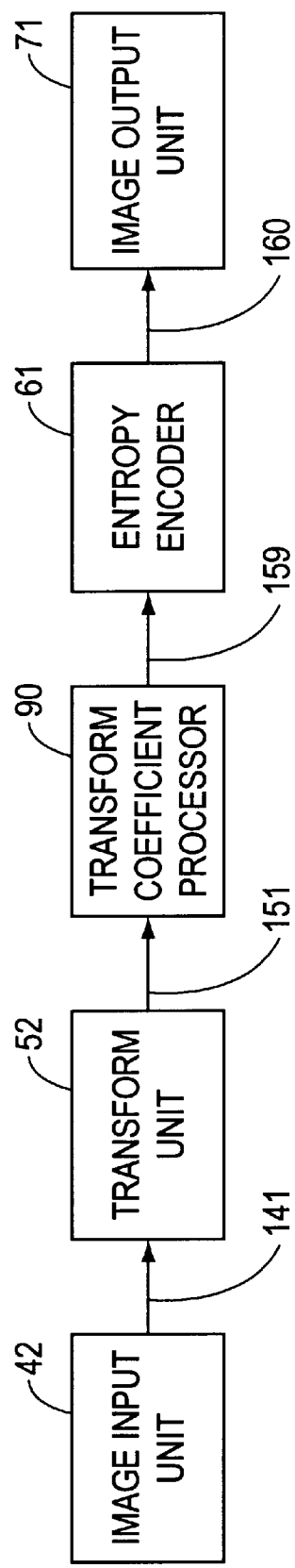
FIG. 15 is a block diagram illustrating a conventional image processing apparatus.
Figure 16A:
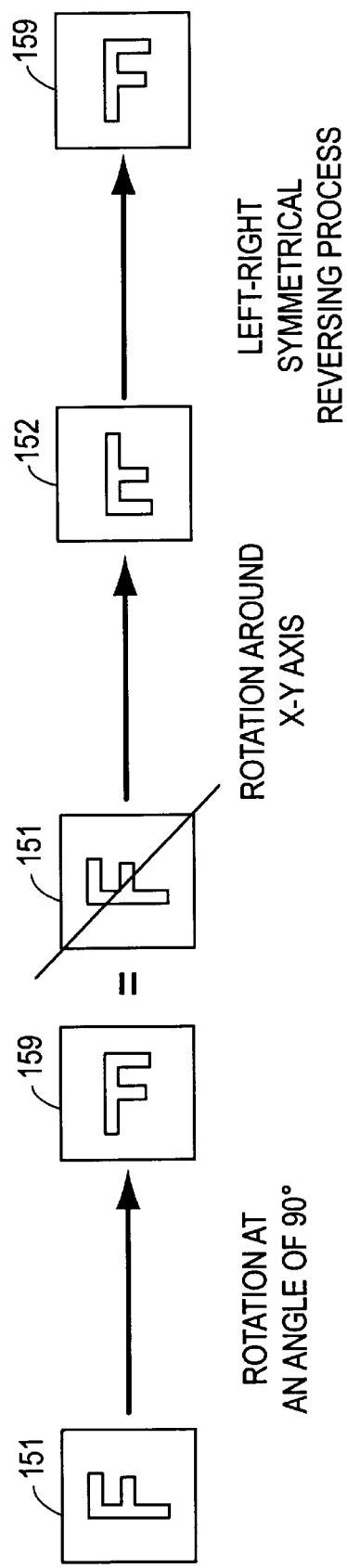
FIG. 16A is a diagram explaining an image rotation process performed by the conventional image processing apparatus.
Figure 16B:
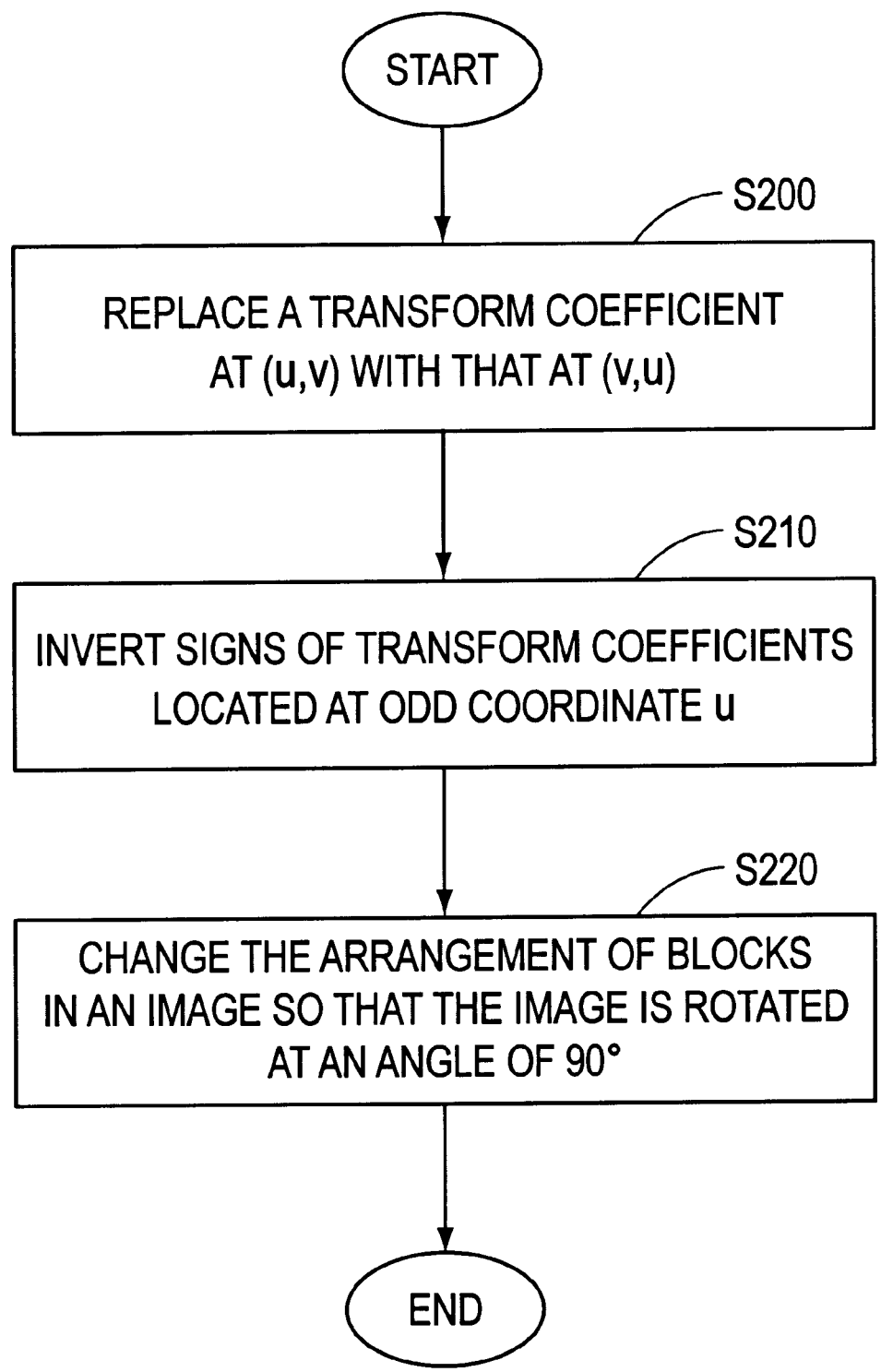
FIG. 16B is a flowchart illustrating an image rotation process performed by the conventional image processing apparatus.
Figure 17A:
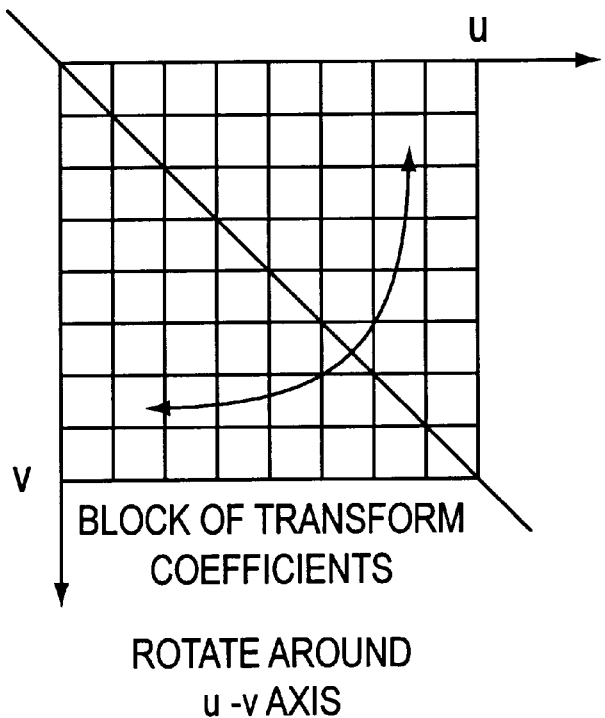
FIGS. 17A, 17B and 17C are diagrams explaining an image rotation process of the conventional image processing apparatus.
Figure 17B:
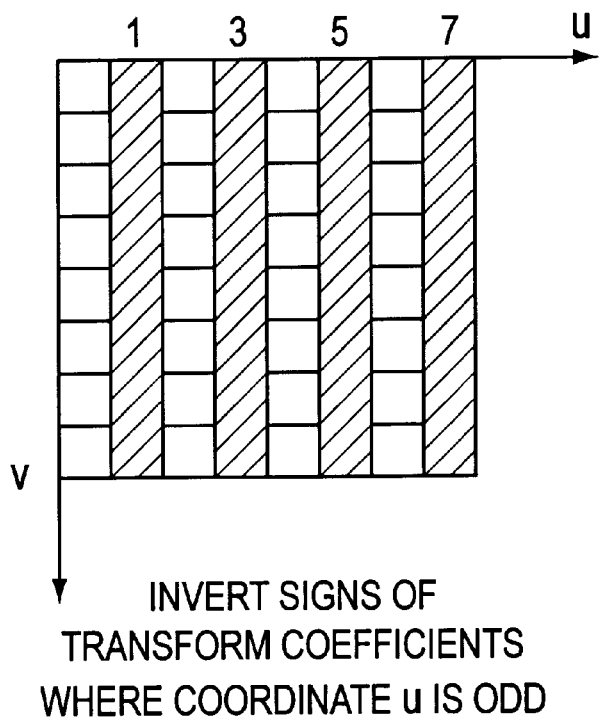
Figure 17C:
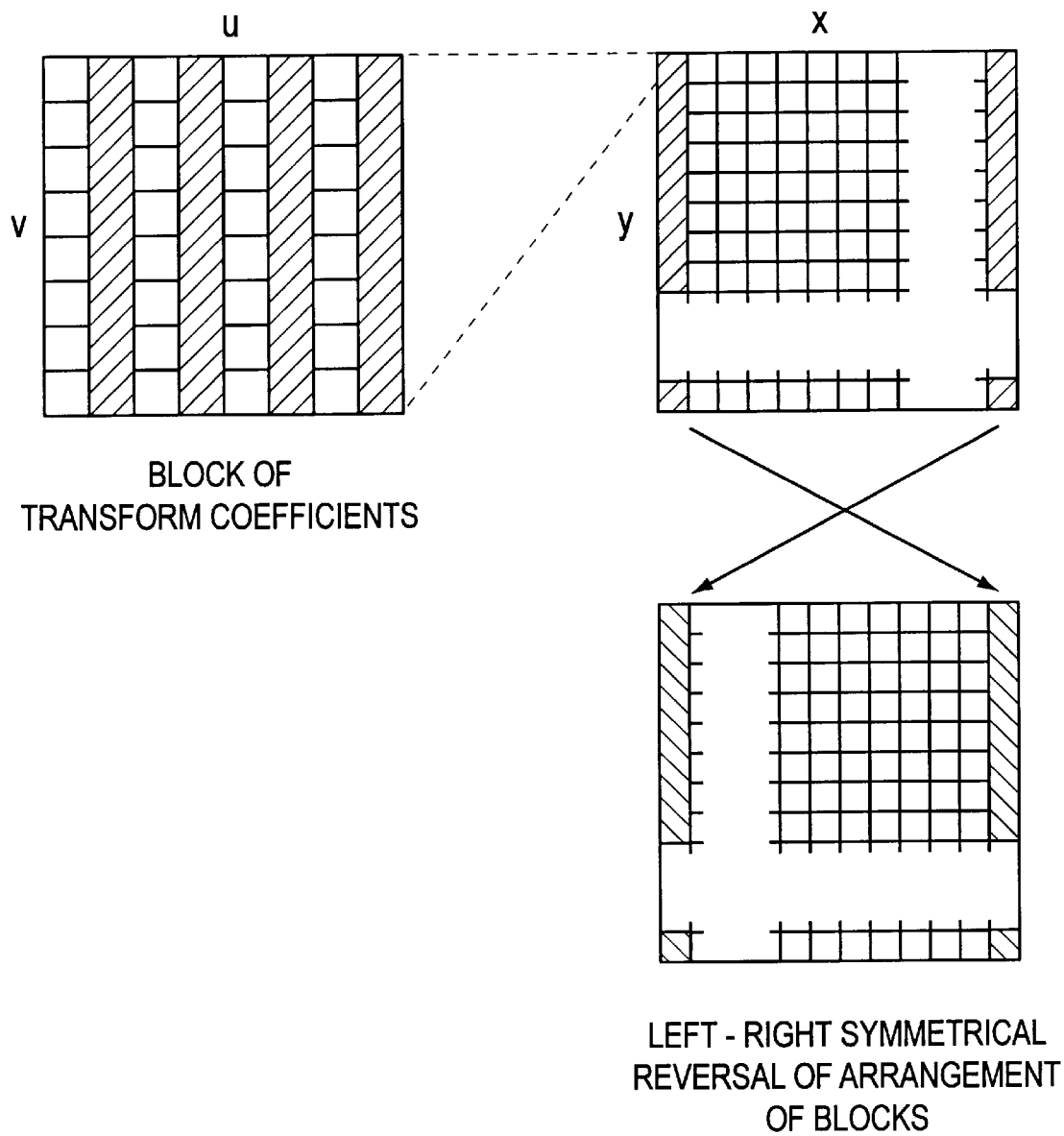
Figure 18:
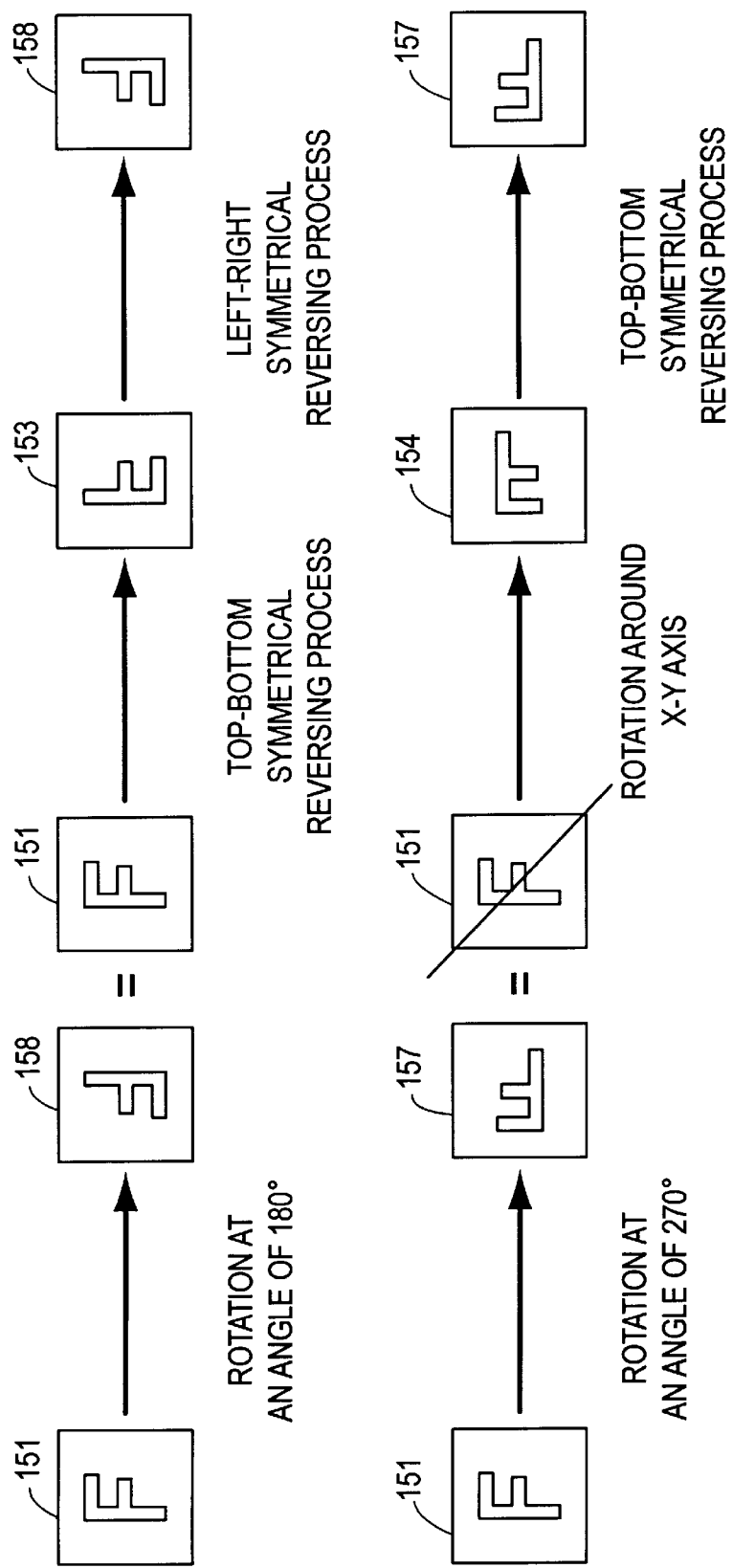
FIG. 18 is a diagram explaining an image rotation process of the conventional image processing apparatus.

Next, the process of step S110 shown in FIG. 13 is explained. FIG. 14 shows data flow when transform-coded image data corresponding to an 8×8 block of transform coefficients is inverse-transformed to an output pixel image by using transform bases rotated at an angle of 45°. As shown in equation (9), a block of transform bases after rotation consists of C0000 through C7700 (u=0, v=0). According to the IDCT bases in equation (13), an IDCT is performed for transform coefficient Y00 by using transform bases C0000 through C7700. As shown in FIG. 14, the IDCT is performed for transform coefficients Y00, . . . , Y77 by using transform bases C0000 through C7700, . . . , C0077 through C7777, respectively. The coordinate (Mdes, Ndes), which is the center of the block in the output image, is calculated by equation (14). (Msrc, Nsrc) is the coordinate of the center of the block in the input image before rotation. As shown in FIG. 14, (M0, N0) is the center of rotation of the entire output image.

$$\begin{pmatrix} M_{des} \\ N_{des} \end{pmatrix} = \begin{pmatrix} \cos\theta & -\sin\theta \\ \sin\theta & \cos\theta \end{pmatrix} \times \begin{pmatrix} M_{src} - M_0 \\ N_{src} - N_0 \end{pmatrix} + \begin{pmatrix} M_0 \\ N_0 \end{pmatrix} \quad (14)$$

As described above, this invention can obtain a decoded image rotated at any arbitrary angle from an image transformed by a frequency transform. In addition, when an image is rotated at any angle and transform-coded, a coded image rotated at any angle can be obtained directly. Therefore, this invention can decrease the required amount of memory and the total processing time as compared with conventional methods.

While the described embodiment uses JPEG compression, the invention is also applicable to MPEG compression. Various other compression techniques, such as, for example, wavelet and fractal compression, can be used with the invention. The invention is applicable to orthogonal transforms other than DCT. Additionally, block transforms other than DCT are also possible. The invention also is applicable to compression processes that segment an image into portions other than rectangular blocks. The entropy coding can be, for example, run-length coding, LZW, minimum redundancy coding and Huffman coding.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An image processing apparatus comprising:

a parameter input unit that inputs a rotation angle;

a basis calculator that calculates transform bases and arranges the transform bases in accordance with the rotation angle input by the parameter input unit;

a coordinate calculator that calculates coordinates in an input image in accordance with the rotation angle input by the parameter input unit;

an image input unit that inputs a part of the input image in accordance with the coordinates calculated by the coordinate calculator;

a transform unit that transforms the part of the input image input by the image input unit into transform coefficients by using the transform bases calculated by the basis calculator; and an entropy encoder that performs entropy coding of the transform coefficients obtained by the transform unit.

2. The image processing apparatus as set forth in claim 1, wherein:

the coordinate calculator is implemented by software; and the transform unit is implemented by hardware.

3. The image processing apparatus as set forth in claim 1, wherein the transform unit performs an orthogonal transform.

4. The image processing apparatus as set forth in claim 1, wherein the transform unit performs a discrete cosine transform.

5. The image processing apparatus as set forth in claim 1, wherein the basis calculator calculates a block of the transform bases, and arranges the block of the transform bases by rotating the block of the transform bases in accordance with the rotation angle input by the parameter input unit.

6. The image processing apparatus as set forth in claim 1, wherein the image processing apparatus is a printer having a printing mechanism.

7. An image processing apparatus that transforms a block of pixel values in a spatial domain into a block of transform coefficients in a frequency domain, comprising:

a basis calculator that calculates a block of transform bases and arranges the block of transform bases in accordance with a rotation angle;

an input unit that inputs blocks of an input image in an arrangement determined in accordance with the rotation angle; and a transform unit that transforms each block in the input image into a block of transform coefficients by using the block of transform bases calculated by the basis calculator.

8. The image processing apparatus as set forth in claim 7, wherein the image processing apparatus is a printer having a printing mechanism.

9. An image processing apparatus comprising:

a parameter input unit that inputs a rotation angle;

a basis calculator that calculates transform bases and arranges the transform bases in accordance with the rotation angle input by the parameter input unit;

an image input unit that inputs a transform-coded image;

an entropy decoder that performs entropy decoding of the input transform-coded image to obtain transform coefficients;

an inverse-transform unit that performs an inverse-transform of the transform coefficients obtained by the entropy decoder into pixel values by using the transform bases calculated by the basis calculator;

a coordinate calculator that calculates coordinates in an output image in accordance with the rotation angle input by the parameter input unit; and an image output unit that outputs the pixel values in accordance with the coordinates calculated by the coordinate calculator.

10. The image processing apparatus as set forth in claim 9, wherein the inverse-transform unit performs an inverse orthogonal transform.

11. The image processing apparatus as set forth in claim 9, wherein the inverse-transform unit performs an inverse discrete cosine transform.

12. The image processing apparatus as set forth in claim 9, wherein:

the coordinate calculator is implemented by software; and the transform unit is implemented by hardware.

13. The image processing apparatus as set forth in claim 9, wherein the basis calculator calculates a block of the transform bases, and arranges the block of the transform bases by rotating the block of the transform bases in accordance with the rotation angle input by the parameter input unit.

14. The image processing apparatus as set forth in claim 9, wherein the image processing apparatus is a printer, and the image output unit outputs the pixel values to a printing mechanism in the printer.

15. An image processing apparatus that transforms a block of transform coefficients in a frequency domain into a block of pixel values in a spatial domain, comprising:

a basis calculator that calculates a block of transform bases and arranges the block of transform bases in accordance with a rotation angle;

a decoder that decodes blocks in an input image so as to obtain blocks of transform coefficients;

an inverse-transform unit that performs an inverse-transform of each block of the transform coefficients into a block of pixel values by using the block of transform bases calculated by the basis calculator; and an output unit that outputs the blocks of the pixel values in an arrangement determined in accordance with the rotation angle.

16. The image processing apparatus as set forth in claim 15, wherein the image processing apparatus is a printer, and the output unit outputs the pixel values to a printing mechanism in the printer.

17. An image processing method that creates an output image by rotating and compressing an input image, comprising the steps of:

inputting a rotation angle;

calculating transform bases and arranging the transform bases in accordance with the input rotation angle;

calculating coordinates in an input image in accordance with the input rotation angle;

inputting a part of the input image in accordance with the calculated coordinates;

transforming the input part of the input image into transform coefficients by using the calculated transform bases; and performing entropy coding of the transform coefficients.

18. The method as set forth in claim 17, wherein the transforming step performs an orthogonal transform.

19. The method as set forth in claim 17, wherein the transforming step performs a discrete cosine transform.

20. The method as set forth in claim 17, wherein the transform bases are calculated by calculating a block of the transform bases, and the block of the transform bases is arranged by rotating the block of the transform bases in accordance with the input rotation angle.

21. The method as set forth in claim 17, wherein the steps are performed by a printer.

22. An image processing method that transforms a block of pixel values in a spatial domain into a block of transform coefficients in a frequency domain, comprising the steps of:

calculating a block of transform bases and arranging the block of transform bases in accordance with a rotation angle;

inputting blocks of an input image in an arrangement determined in accordance with the rotation angle; and transforming each block in the input image into a block of transform coefficients by using the calculated block of transform bases.

23. The method as set forth in claim 22, wherein the steps are performed by a printer.

24. An image processing method that creates an output image by decompressing and rotating an input image, comprising the steps of:

inputting a rotation angle;

calculating transform bases and arranging the transform bases in accordance with the input rotation angle;

inputting a transform-coded image;

performing entropy decoding of the input transform-coded image so as to obtain transform coefficients;

performing an inverse-transform of the transform coefficients into pixel values by using the calculated transform bases;

calculating coordinates in an output image in accordance with the input rotation angle; and outputting the pixel values in accordance with the calculated coordinates.

25. The method as set forth in claim 24, wherein the inverse-transform step performs an orthogonal transform.

26. The method as set forth in claim 24, wherein the inverse-transform step performs a discrete cosine transform.

27. The method as set forth in claim 24, wherein the transform bases are calculated by calculating a block of the transform bases, and the block of the transform bases is arranged by rotating the block of the transform bases in accordance with the input rotation angle.

28. The method as set forth in claim 24, wherein the pixel values are output to a printer.

29. An image processing method that transforms a block of transform coefficients in a frequency domain into a block of pixel values in a spatial domain, comprising the steps of:

calculating a block of transform bases and arranging the block of transform bases in accordance with a rotation angle;

decoding blocks in an input image so as to obtain blocks of transform coefficients;

inverse-transforming each block of the transform coefficients into a block of pixel values by using the calculated block of transform bases; and outputting the blocks of the pixel values in an arrangement determined in accordance with the rotation angle.

30. The method as set forth in claim 29, wherein the pixel values are output to a printing mechanism in a printer.

31. A computer data signal embodied in a carrier wave, the data signal representing a control program that is readable by a controller of an image processor to transform a block of pixel values in a spatial domain into a block of transform coefficients in a frequency domain, the control program including instructions to:

calculate a block of transform bases and arrange the block of transform bases in accordance with a rotation angle;

input blocks of an input image in an arrangement determined in accordance with the rotation angle; and transform each block in the input image into a block of transform coefficients by using the calculated block of transform bases.

32. The data signal as set forth in claim 31, wherein the carrier wave is stored in a recording medium.

33. The data signal as set forth in claim 31, wherein the control program further includes an instruction to perform entropy coding of the transform coefficients.

34. The data signal as set forth in claim 31, wherein the transform instruction is to perform an orthogonal transform.

35. The data signal as set forth in claim 31, wherein the transform instruction is to perform a discrete cosine transform.

36. The data signal as set forth in claim 31, wherein the instruction to calculate and arrange the block of transform bases includes an instruction to rotate the block of transform bases in accordance with the input rotation angle.

37. A computer data signal embodied in a carrier wave, the data signal representing a control program that is readable by a controller of an image processor to transform a block of transform coefficients in a frequency domain into a block of pixel values in a spatial domain, the control program including instructions to:

calculate a block of transform bases and arrange the block of transform bases in accordance with a rotation angle;

decode blocks in an input image so as to obtain blocks of transform coefficients;

inverse-transform each block of the transform coefficients into a block of pixel values by using the calculated block of transform bases; and output the blocks of the pixel values in an arrangement determined in accordance with the rotation angle.

38. The data signal as set forth in claim 37, wherein the carrier wave is stored in a recording medium.

39. The data signal as set forth in claim 37, wherein the inverse-transform instruction is to perform an orthogonal transform.

40. The data signal as set forth in claim 37, wherein the inverse-transform instruction is to perform a discrete cosine transform.

41. The data signal as set forth in claim 37, wherein the instruction to calculate and arrange the block of transform bases includes an instruction to rotate the block of the transform bases in accordance with the input rotation angle.

* * * * *